UNITED STATES PATENT OFFICE.

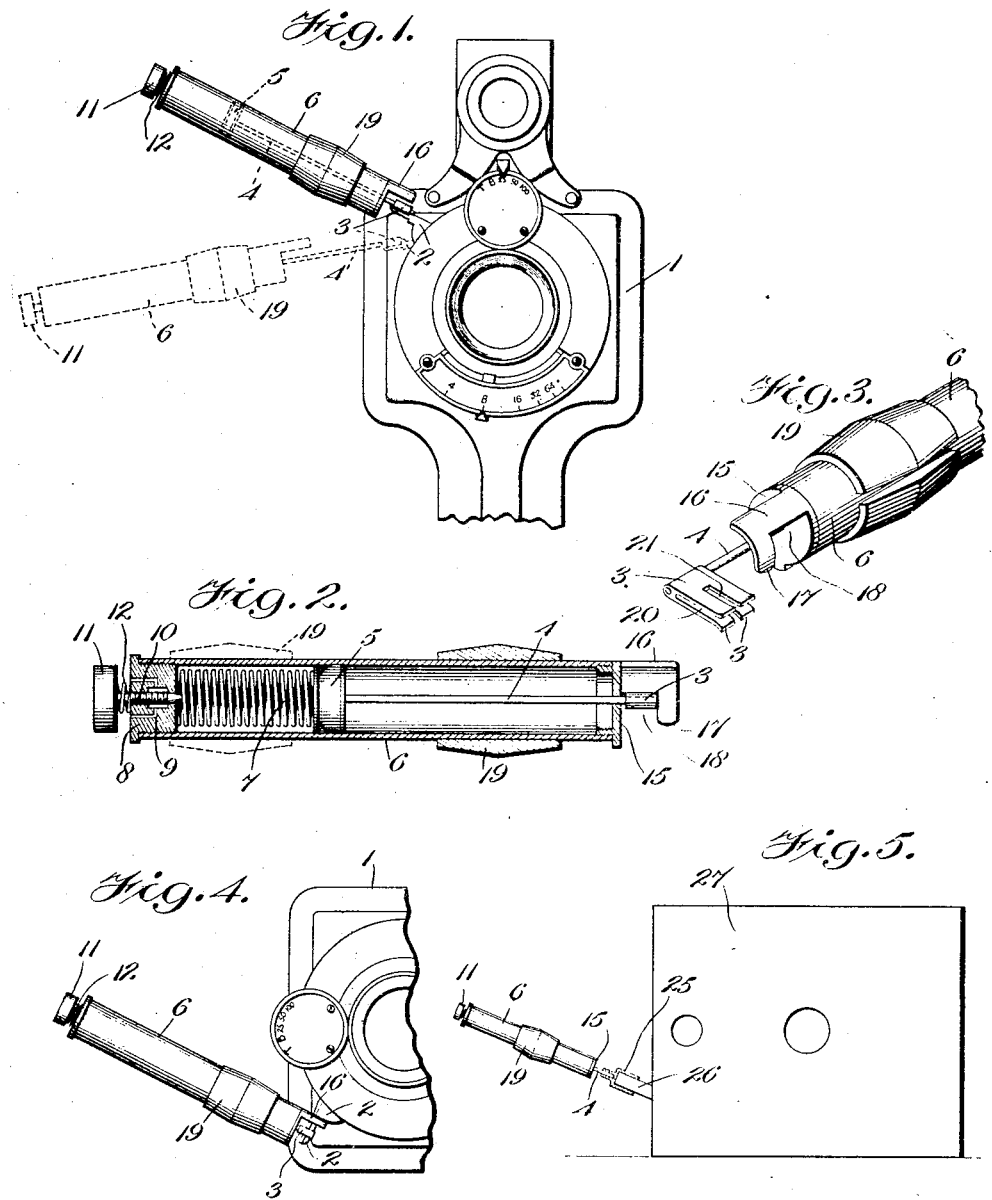

NORMAN S. McEWEN, OF NASHVILLE, TENNESSEE.

CAMERA-TIMING DEVICE.

1,285,288.  Specification of Letters Patent.  Patented Nov. 19, 1918.

Application filed July 7, 1917. Serial No. 179,258.

*To all whom it may concern:*

Be it known that I, NORMAN S. McEWEN, a citizen of the United States, residing at Nashville, in the county of Davidson and State of Tennessee, have invented certain new and useful Improvements in Camera-Timing Devices; and I do hereby declare the following to be a full, clear, and exact description of the invention, such as will enable others skilled in the art to which it appertains to make and use the same.

This invention relates to camera timing devices and has for its object to provide a device of this nature acting upon the lever principle and which device will be simple in construction, certain in action and comparatively inexpensive to manufacture.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views:—

Figure 1 is an elevational view of a portion of the camera with the invention applied thereto;

Fig. 2 is a longitudinal sectional view of the timing device disconnected from the camera;

Fig. 3 is a perspective view of a portion of the parts shown in Fig. 2;

Fig. 4 is a view similar to Fig. 1, but illustrating how this timing device may be applied when the camera has been turned through an angle of 90° and is resting on its side; and Fig. 5 is a diagrammatic view illustrating a somewhat modified form of timing device which is applicable to a box type of camera.

1 indicates a camera the shutter of which is controlled by the lever 2, and 3 illustrates a claw or lever engaging member rigid with the piston rod 4 carried by the piston 5 located in the cylinder 6, and actuated by the spring 7. One end of the cylinder 6 is closed by the screw threaded plug 8 having the air passages 9 controlled by the screw threaded valve member 10 having the thumb actuated piece 11, and 12 represents a spring for holding the said valve 10 in its adjusted position. The other end of said cylinder 6 is closed as by the screw threaded member 15 having the extension 16, provided with the holding lug 17 separated from said member 15 by the space 18 as shown. 19 represents an adjustable weight which may be moved from one end of the lever to the other, as indicated by the dotted lines in Fig. 2, and which serves in a manner to control the times of tripping the shutter as will appear more fully below.

The claw like member 3 is provided with the slit 20 adapted to engage the shutter controlling lever 2 when the camera is held in the position shown in Fig. 1, and said claw like member 3 is further provided with the slit 21 extending at right angles to the slit 20, adapted to engage the shutter controlling lever 2 when the camera has been turned through an angle of 90°, as shown in Fig. 4.

In the somewhat modified form of invention shown in Fig. 5, the parts are the same as those just described except the closing cap member 15 instead of being provided with the extension 16, and lug 17, is plain and the piston rod 4 is provided with the engaging member 25 adapted to grip the shutter controlling lever 26 of the box like camera 27.

The operation of this invention will be clear from the foregoing but may be briefly summarized as follows:—

When it is desired to actuate the camera shutter after the expiration of predetermined intervals of time, the thumb piece 11 and valve 10 having been properly adjusted, the lever engaging member 3 is pushed home into the position shown in Fig. 2, whereupon it is made to occupy the space 18 by turning the same on the piston rod 4 as an axis, and is held in said position against the pressure of the spring 7 by the lug or claw 17. When the parts are in the position just described, the said lever engaging member 3 may be then snapped on to the shutter controlling lever 2, by making the said lever 2 enter the slot 20, whereupon the parts will be held in the position shown in Fig. 1. The cylinder 6 may now be turned around the rod 4, as an axis whereupon the lug 17 will disengage the member 3 and the spring 7 will push the cylinder 6 outwardly or toward the left, as seen in Fig. 1, whereupon the center of gravity of the system will travel toward the left and a greater and greater leverage will be exerted upon the shutter controlling lever 2 until the latter is brought into proper position and the shutter is actuated. Of course, the speed of movement of the cylinder 6 will be governed by the position of the valve 10, but this said speed may be further regulated by shifting the adjustable weight 19 into the proper position along the length of the cylinder 6. As the cylinder 6 moves toward the left, as above described, the vacuum created by said movement inside the cylinder will be filled with air passing through the passages 9, and the air on the right hand side of the piston 5 will pass out of the cylinder 6 through leakage around the piston rod 4.

When the camera is turned through an angle of 90° as indicated in Fig. 4, instead of the slot 20 engaging the shutter controlling lever 2, the slot 21 engages said lever and the same action as that above disclosed takes place.

In the somewhat modified form of the invention illustrated in Fig. 5, the gripping member 25 is readily snapped over the end of the shutter controlling lever 26, and the above action likewise takes place. It will be seen that the above disclosed timing device is adapted for use in different styles of cameras having shutter closing levers, and that it is capable of two adjustments, the one by means of the valve 10 and the other by means of the shifting weight 19. The full sized device is so small that it may be carried in the vest pocket, or it may be readily attached to the camera itself.

It is obvious that those skilled in the art may vary the details of construction as well as the arrangement of parts without departing from the spirit of the invention and therefore, I do not wish to be limited to the above disclosure except as may be required by the claims.

What I claim is:—

1. In a timing device for cameras the combination of a piston; a piston rod; means carried by said piston rod having a pair of slots at right angles to each other for engaging the shutter controlling lever of the camera; a cylinder supported by said piston and lever provided with a spring for causing relative movement between said piston and cylinder; an adjustable weight carried by the cylinder, and means for controlling the admission of air to said cylinder, substantially as described.

2. In a timing device for cameras the combination of a piston; a cylinder; an adjustable weight carried by the cylinder, a spring for moving said cylinder relative to said piston; a piston rod; and means provided with a pair of slots at right angles to each other carried by said rod for supporting said piston and cylinder from the shutter controlling lever of the camera, substantially as described.

3. In a timing device for cameras the combination of a piston; a cylinder; a spring for moving said cylinder relative to said piston; adjustable means for controlling the admission of air into said cylinder; an adjustable weight carried by said cylinder; a piston rod; and means provided with a pair of slots at right angles to each other carried by said rod for supporting said piston and cylinder from the shutter controlling lever of the camera, substantially as described.

4. In a timing device for cameras the combination of a cylinder; a piston in said cylinder; an adjustable weight carried by the cylinder, a piston rod provided with a shutter controlling lever engaging member having a pair of slots at right angles to each other adapted to support said piston and cylinder from said lever when the camera occupies different positions; and means for moving said cylinder relatively to said piston, substantially as described.

5. In a timing device for cameras the combination of a cylinder; a piston in said cylinder; an adjustable weight carried by the cylinder, a piston rod provided with a lever engaging member provided with a pair of slots at right angles to each other and each adapted to support said piston and cylinder from said lever; means for moving said cylinder relatively to said piston; and means carried by said cylinder for holding said cylinder and piston against said relative movement, substantially as described.

In testimony whereof I affix my signature, in presence of two witnesses.

NORMAN S. McEWEN.

Witnesses:
JOHN O. GARRETT,
SEBASTIAN BEICHEL.

Copies of this patent may be obtained for five cents each, by addressing the "Commissioner of Patents Washington, D. C."